(12) United States Patent
Robinson (10) Patent No.: US 9,671,987 B2
(45) Date of Patent: Jun. 6, 2017

(54) COMPATIBILITY OF CONFIGURATION BETWEEN VARIABLE AND FIXED PRINT JOB DATA

(71) Applicant: Xerox Corporation, Norwalk, CT (US)

(72) Inventor: David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/861,180

(22) Filed: Sep. 22, 2015

(65) Prior Publication Data

US 2017/0083267 A1 Mar. 23, 2017

(51) Int. Cl.
*G06F 3/12* (2006.01)
*H04N 1/00* (2006.01)
*G06K 15/02* (2006.01)
*H04N 1/46* (2006.01)
*H04N 1/405* (2006.01)

(52) U.S. Cl.
CPC .......... *G06F 3/1243* (2013.01); *G06F 3/1205* (2013.01); *G06F 3/1255* (2013.01); *G06F 3/1285* (2013.01); *G06K 15/1836* (2013.01); *H04N 1/00244* (2013.01); *H04N 1/40018* (2013.01); *H04N 1/46* (2013.01); *H04N 2201/0094* (2013.01)

(58) Field of Classification Search
CPC .... G06F 3/1243; G06F 3/1205; G06F 3/1255; G06K 15/1836

USPC ....... 358/1.15, 1.9, 1.18, 538, 540; 715/204, 715/225
See application file for complete search history.

(56) References Cited

U.S. PATENT DOCUMENTS

| | | | |
|---|---|---|---|
| 6,049,390 | A | 4/2000 | Notredame et al. |
| 6,360,008 | B1 | 3/2002 | Suzuki et al. |
| 7,324,240 | B2 | 1/2008 | Ng |
| 7,391,537 | B2 | 6/2008 | Eschbach et al. |
| 7,639,400 | B2 | 12/2009 | Hains |
| 8,447,204 | B2 | 5/2013 | Qiao et al. |
| 8,477,376 | B2 | 7/2013 | Robinson et al. |
| 2006/0114481 | A1 | 6/2006 | Moore |
| 2007/0253027 | A1* | 11/2007 | Hiebert .............. G03G 15/5087 358/1.18 |
| 2008/0170269 | A1 | 7/2008 | Kaneko et al. |
| 2010/0257446 | A1* | 10/2010 | Woolfe ................. G06F 3/1204 715/274 |
| 2012/0189776 | A1 | 7/2012 | Robinson et al. |

* cited by examiner

*Primary Examiner* — Jamares Q Washington
(74) *Attorney, Agent, or Firm* — Gibb & Riley, LLC (57) ABSTRACT

A printing processor receives print job instructions to combine variable printing information and fixed data to build a print job to be printed using a printing engine. The variable printing information is unrasterized-type data. The printing processor evaluates the print job instructions to determine whether the configuration of the variable printing information is compatible with configurations of different fixed data forms (the fixed data forms are rasterized-type data). The graphic user interface displays menu selections of only the fixed data forms determined to be compatible with the configuration of the variable printing information.

20 Claims, 9 Drawing Sheets

COMPATIBILITY OF CONFIGURATION BETWEEN VARIABLE AND FIXED PRINT JOB DATA

BACKGROUND

Systems and methods herein generally relate to the creation and use of print jobs and more particularly to the compatibility of configurations between variable and fixed print job elements.

While digital communications have dramatically increased in recent decades, printed documents maintain a significant role in society's ability to store data and communicate. In order to perform printing operations, it is often useful to build what is known as a print job, by defining the data and printing configuration that will be used to create the printed document. A print job includes data that will be printed, and also specifies various settings that will be utilized during the printing process.

In one example, a print job can include variable data and fixed data. The fixed data will not change between printed documents; however, the variable data can change. Therefore, many print jobs are built by selecting a non-changing fixed background form, and defining variable data that will be added to the background to produce the printed documents.

SUMMARY

Exemplary methods herein receive, into a graphic user interface, print job instructions to combine variable printing information and fixed data to build a print job to be printed using a printing engine. The printing engine prints using rasterized-type data (e.g, bitmaps, etc.). The variable printing information is unrasterized-type data. For example, the variable printing information can be variable data that changes for each print job; while, to the contrary, the fixed data form is previously rasterized data that is unchanging and contains the same data for all corresponding jobs (and can be, for example a watermark, a printed texture, a background color, and/or background artwork, etc.).

In one example, these methods evaluate the print job instructions (using a printing processor) to determine whether a configuration of the variable printing information is compatible with configurations of various fixed data forms. This evaluation process can, for example, compare aspects of the variable printing information and the fixed data forms, including: resolution, marking materials utilized, halftone dot frequency, sheet size, bit depth etc. The variable printing information and the fixed data forms can each include multiple color planes, and in such situations the process of evaluating the print job instructions determines the compatibility of each of the color planes of the variable printing information with each of the fixed data forms. With this, these methods display menu selections of only the fixed data forms that have been determined to be compatible with the configuration of the variable printing information of the specific print job.

Other methods herein similarly receive (e.g., into a graphic user interface) print job instructions to combine job-specific variable printing information and a specific fixed data form to build a print job to be printed using a printing engine. These methods can also evaluate the print job instructions (e.g., again using the printing processor) to determine whether the configuration of the variable printing information is compatible with the configuration of the fixed data form selected for this print job. As a result, these methods can display a non-compatibility message on the graphic user interface, if the configuration of the variable printing information is not compatible with the configuration of the fixed data form selected by the user for the specific print job.

In addition, in this situation such methods can be restricted to only perform rasterization to convert the variable printing information from the unrasterized-type data to the rasterized-type data, if the configuration of the variable printing information has been determined to be compatible with the configuration of the fixed data form by the printing processor. Also, if the non-compatibility message is displayed, such methods can also display menu options for user selection that provide alternative fixed data forms that have a configuration that is compatible with the configuration of the variable printing information.

Exemplary printing systems herein include, among other components: a printing engine (where the printing engine performs printing using rasterized-type data); a printing processor operatively (meaning directly or indirectly) connected to the printing engine; a graphic user interface operatively connected to the printing processor; etc.

The printing processor can receive print job instructions to combine variable printing information and fixed data forms to build a print job to be printed using the printing engine. The printing processor can evaluate the print job instructions to determine whether the configuration of the variable printing information is compatible with the configuration of the fixed data forms, for example, by comparing aspects of the variable printing information and the fixed data forms, including resolution, marking materials utilized, halftone dot frequency, sheet size, bit depth etc. The variable printing information and the fixed data form may each include multiple color planes, and therefore the printing processor can evaluate the print job instructions to determine compatibility of each of the color planes of the variable printing information and the fixed data forms. As a result, the graphic user interface displays menu selections of only the fixed data forms determined to be compatible with the configuration of the variable printing information of the print job.

The printing processor can also receive print job instructions to combine variable printing information and a specific fixed data form to build a print job to be printed using the printing engine. In this situation, the printing processor evaluates the print job instructions to determine whether a configuration of the variable printing information is compatible with a configuration of the fixed data form selected by the user for the print job. Here, the graphic user interface displays a non-compatibility message if the configuration of the variable printing information is not compatible with the configuration of the fixed data form selected by the user for the print job. If the non-compatibility message is displayed, the graphic user interface can also display menu options for alternative fixed data forms that have a configuration that is compatible with the configuration of the variable printing information. Also, in this situation, the printing processor can be limited to convert the variable printing information from unrasterized-type data to rasterized-type data only if the configuration of the variable printing information is compatible with the configuration of the fixed data form.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, print jobs can include fixed data portions and variable data portions. Sometimes the color configurations for the fixed data portions and the variable data portions are not compatible, which results in poor image quality and job integrity issues, or can even cause the printing system to stop printing and display faults. For example, background forms can be created as part of the fixed data portions of a print job. Such background forms have specific configurations that can define: the various inks, toners, or other marketing materials that are to be utilized; the halftone dot frequency; the resolution; the sheet size; bit depth; as well as many other configuration options.

One feature of such background forms is that they can be saved in a rasterized format (ready-to-print images); avoiding the need for the printing processor to rasterize that portion of the print job. Further, background forms are a known quantity that will print predictably in a specific printing environment. In other words, once a background form has been rasterized and printed, the user predictably knows how the background form will print, and background forms are immune to new job controls or changes to image quality settings.

Thus, with rasterized background forms, the variable print data is rasterized and then merged with the rasterized background form, thereby saving a substantial amount of processing resources. Within the print job parameters file are page-by-page parameters for color planes per image/page (which includes the number of planes and the colorant designation for each plane); print resolution (e.g., 600×600 dots per inch (DPI).); etc. Additionally, the background form content information can be made available to clients via gateway status information, the job reconciler component, etc.

To facilitate the use of such background forms, the systems and methods herein determine whether the configuration options selected for the variable data portions of the print job are compatible with the configuration options of the background form. If they are compatible, rasterization of the variable data portion of the print job is performed, and such is merged with the fixed-data of the background form. However, if the two are not compatible, the systems and methods herein provide a message regarding the non-compatibility, and prevent the rasterization of the variable data portion of the print job until the background form and the variable data portion of the print job can be made compatible.

For example, when a print job (using a background form designation) is submitted, the client graphic user interfaces (GUI(s)), digital front end (DFE) queue/job properties/page exception GUIs, and/or DFE reconciliation module (job chooser) compares the background form information and the job information. The GUIs only allow selections of background form and job attributes that are compatible. The job chooser faults any invalid background form/job attributes combination. Thus, when a job's parameters are being defined (including a background form designation) the client GUI(s), DFE queue/job properties/page exception GUIs only enable background form selections that agree with the other job properties. Invalid background forms are filtered out and/or not shown as a viable choice.

Due the job parameter precedence model, it is possible that a submitted job and associated queue may yield a mismatched set of job parameters for a selected background form. The job chooser will perform a final comparison and fault any invalid background form/job attributes combination. All background forms can be viewed along with their job properties in a background form manager.

In other words, the systems and methods herein recognize and prevent the use of mismatched background forms colorant content with defined job colorant content. For example, systems and methods herein validate the match between the background form and the print job's resolution (e.g., a 600 DPI form will not be merged with a 300 DPI job).

Figure 1:
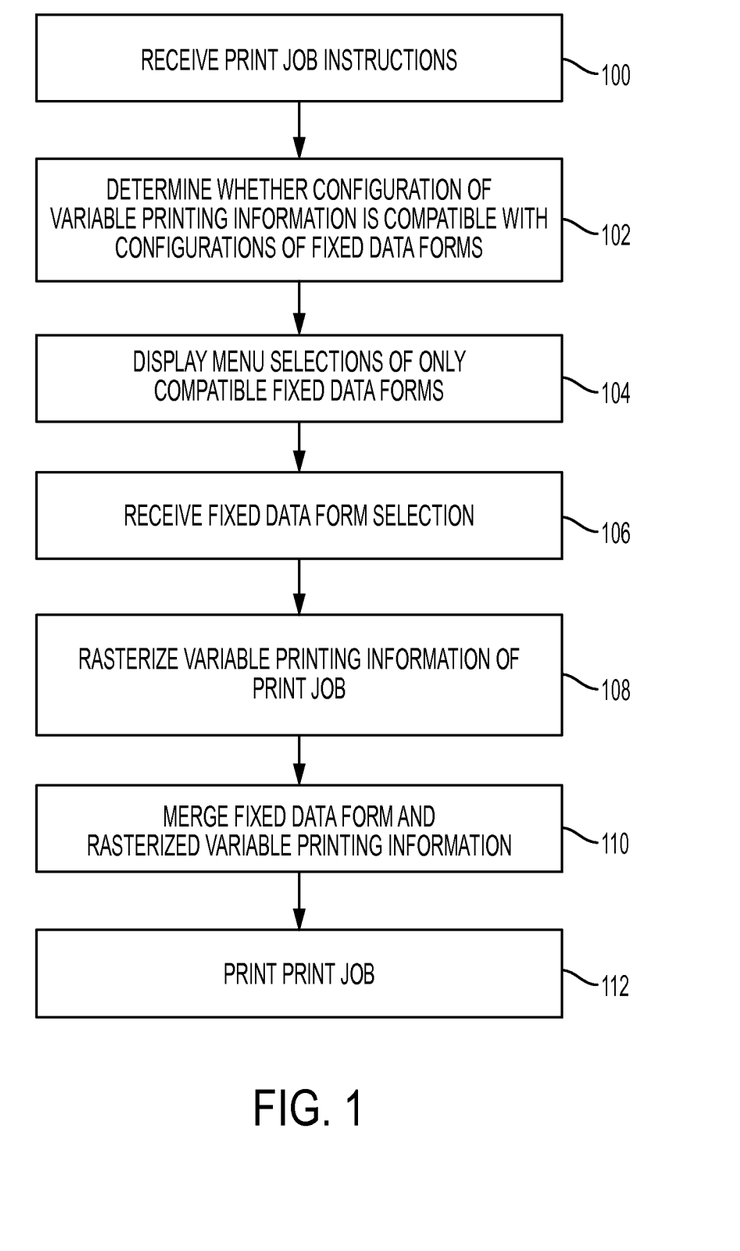
FIG. 1 is a flow diagram illustrating various methods herein.

FIG. 1 is flowchart illustrating exemplary methods herein. In item 100, these exemplary methods receive, into a graphic user interface, print job instructions to combine variable printing information and fixed data to build a print job to be printed using a printing engine. The printing engine prints using rasterized-type data (e.g, bitmaps, etc.). The variable printing information is unrasterized-type data. For example, the variable printing information can be variable data that changes for each print job; while, to the contrary, the fixed data form is previously rasterized data that is unchanging and contains the same data for all corresponding jobs (and can be, for example a watermark, a printed texture, a background color, and/or background artwork, etc.).

In the example shown in FIG. 1, in item 102 these methods evaluate the print job instructions (using a printing processor) to determine whether a configuration of the variable printing information is compatible with configurations of various fixed data forms. This evaluation process in item 102 can, for example, compare aspects of the variable printing information and the fixed data forms, including: resolution, marking materials utilized, halftone dot frequency, sheet size, bit depth, etc. The variable printing information and the fixed data forms may each include multiple color planes, and in such situations the process of evaluating the print job instructions in item 102 determines the compatibility of each of the color planes of the variable printing information with each of the fixed data forms. With this, in item 104, these methods display menu selections of only the fixed data forms that have been determined to be compatible with the configuration of the variable printing information of the specific print job.

Following this, the user selects one of the compatible fixed data forms causing the processor to receive the fixed data form selection from the user, as shown in item 106. Next, the variable printing information of the print job is rasterized in item 108. Then, the rasterized variable printing information is merged with the selected (and previously rasterized) fixed data form in item 110, and this merged rasterized data is printed as the print job in item 112.

Figure 2:
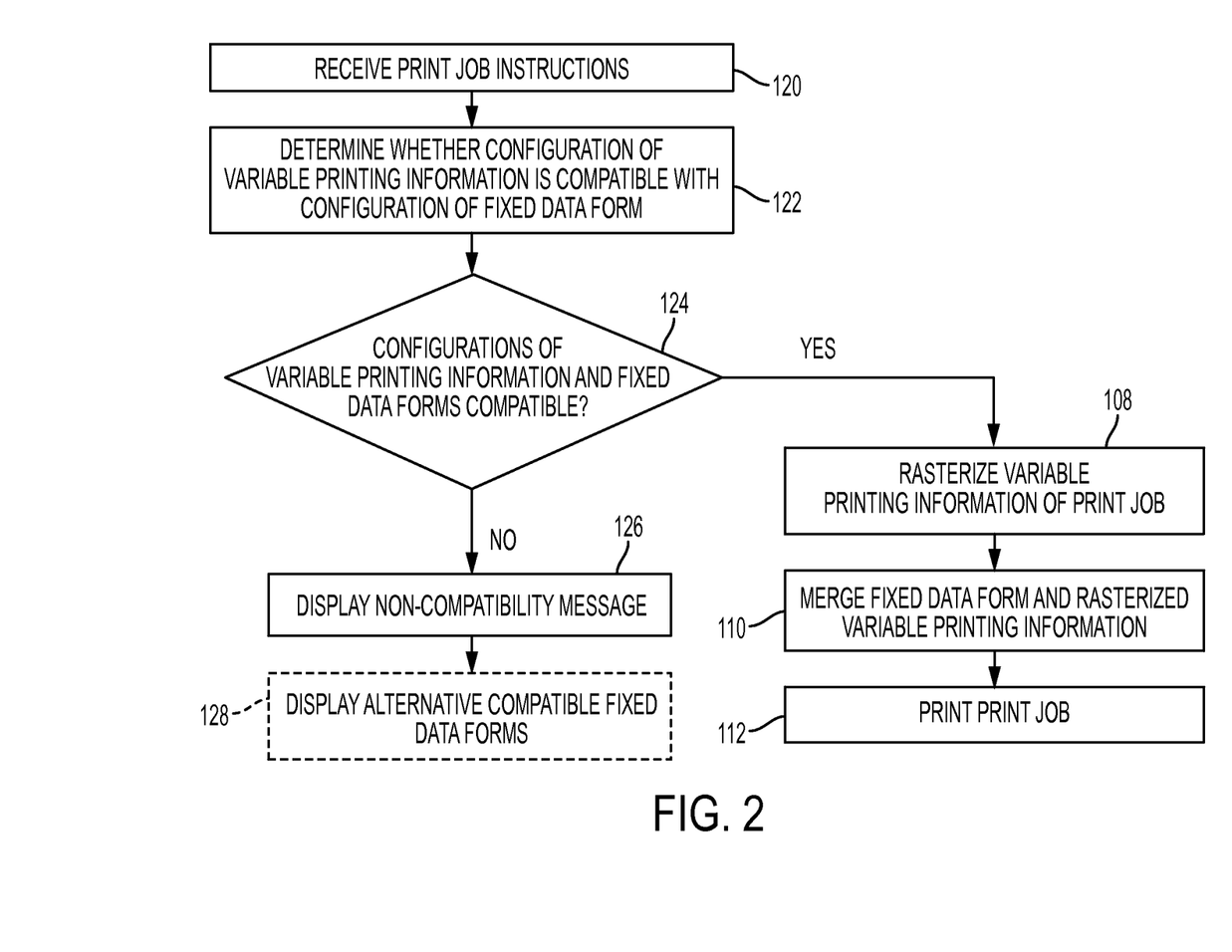
FIG. 2 is a flow diagram illustrating various methods herein.

FIG. 2 illustrates other methods herein, which similarly receive (e.g., into a graphic user interface) print job instructions to combine job-specific variable printing information and a specific fixed data form (in item 120) to build a print job to be printed using a printing engine. As shown in item 122, these methods can also evaluate the print job instructions (e.g., again using the printing processor) to determine whether the configuration of the variable printing information is compatible with the configuration of the fixed data form selected for this print job.

As shown by decision box 124, if the configuration of the variable printing information is not compatible with the configuration of the fixed data form selected by the user for the specific print job, processing proceeds to item 126, where these methods display a non-compatibility message on the graphic user interface. In addition, in this situation (as shown by item 128 in FIG. 2) if the non-compatibility message is displayed, such methods can also display menu options for user selection that provide alternative fixed data forms that have a configuration that is compatible with the configuration of the variable printing information.

As also shown by decision box 124, if the configuration of the variable printing information is compatible with the configuration of the fixed data form selected by the user for the specific print job, processing proceeds to items 108, 110, and 112 where the rasterization, emerging and printing that is discussed above are performed. Thus, as shown by decision box 124, these methods only perform rasterization (to convert the variable printing information from the unrasterized-type data to the rasterized-type data) if the configuration of the variable printing information has been determined to be compatible with the configuration of the fixed data form by the printing processor, thereby not performing unnecessary rasterization processing to conserve processing resources.

Figure 3:
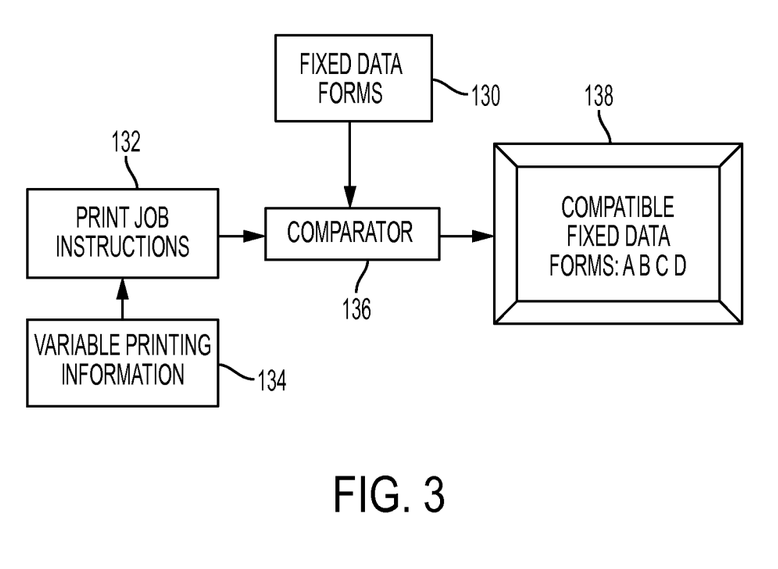
FIG. 3 is a schematic diagram illustrating processing herein.

Thus, the processing shown in FIG. 1 provides the user with compatible fixed data forms. This is also shown in the diagram presented in FIG. 3. More specifically, these exemplary methods receive print job instructions 132 to combine variable printing information 134 and fixed data 130 to build a print job to be printed using a printing engine. The comparator 136 evaluates the print job instructions 132 to determine whether a configuration of the variable printing information 134 is compatible with configurations of various fixed data forms 130. With this, these methods display menu selections of only the fixed data forms that have been determined to be compatible with the configuration of the variable printing information of the specific print job, as shown in item 138.

Figure 4:
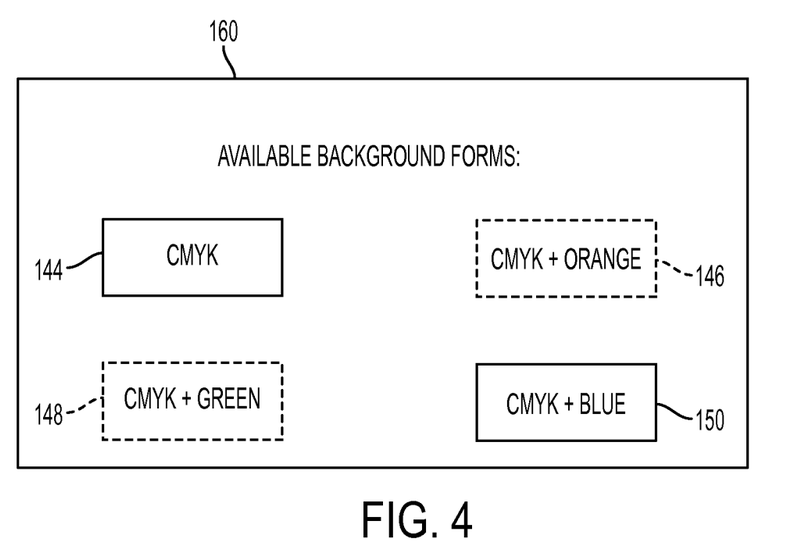
FIG. 4 is an exemplary screen display provided by various methods herein.
Figure 5:
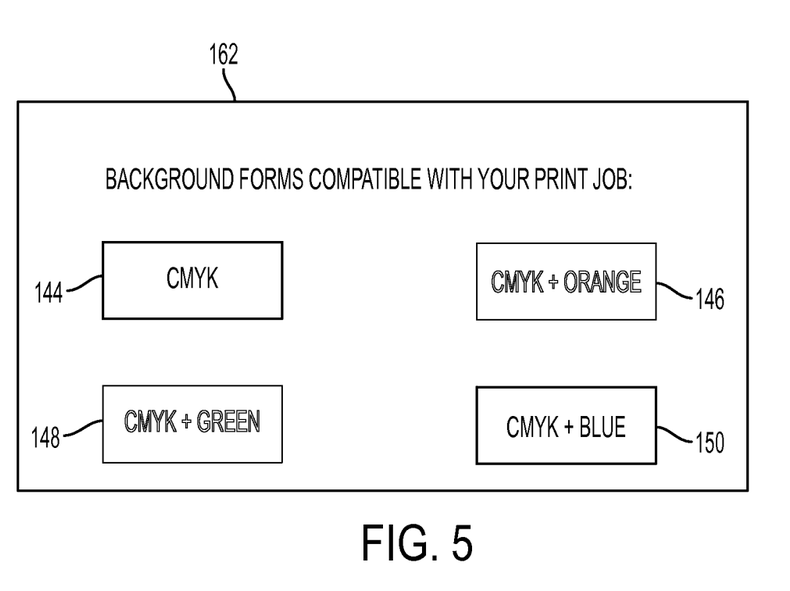
FIG. 5 is an exemplary screen display provided by various methods herein.

FIGS. 4-5 show an example of how various fixed data forms can be made available to the user through menu selections on a graphic user interface. More specifically, in FIG. 4 a screen view 160 can be presented on graphic user interface where four available fixed data forms (shown in the drawings as background forms 144, 146, 148, and 150) are presented to the user for selection. These forms include different inks, toners, or marking materials. Background form 144 includes CMYK (cyan, magenta, yellow, and black) marking materials, background form 146 includes CMYK and orange marking materials, background form 148 includes CMYK and green marking materials, and background form 150 includes CMYK and blue marking materials.

In FIG. 4, all four of the available background forms are shown as being selectable. However, in FIG. 5 as shown in screen view 162, after the print job is evaluated (in item 102 in FIG. 1) in this example only background forms 144 and 150 are determined to be compatible with the print job. Therefore, background forms 146 and 148 are shown as being not available either by being grayed out, or by being removed completely from the menu choices. Those ordinarily skilled in the art would understand that this is just one example of how the compatible fixed data forms could be presented to the user, and that many other methodologies could be utilized to provide such information to the user through the graphic user interface.

Figure 6:
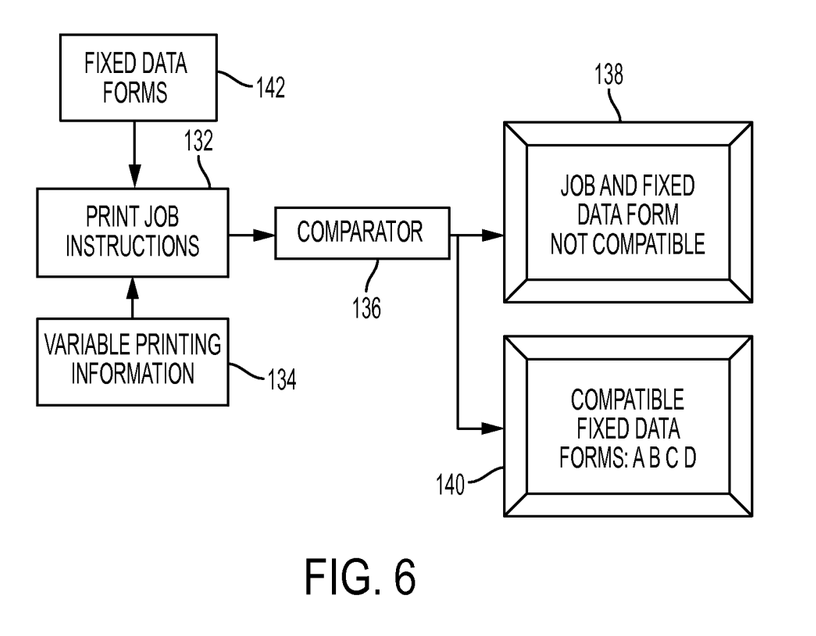
FIG. 6 is a schematic diagram illustrating processing herein.

As noted above, the processing shown in FIG. 2 provides the user with a non-compatibility message if the configuration of the variable printing information is not compatible with the configuration of the fixed data form selected by the user for the specific print job. This is also shown in the diagram presented in FIG. 6. More specifically, as shown in FIG. 6, methods herein receive print job instructions 132 to combine job-specific variable printing information 134 and a specific fixed data form 142 to build a print job to be printed using a printing engine. The comparator 136 evaluates the print job instructions (item 122 in FIG. 2) to determine whether the configuration of the variable printing information 134 is compatible with the configuration of the fixed data form 142 selected in the print job instructions 132 for this print job. A non-compatibility message 138 is displayed on the graphic user interface if the configuration of the variable printing information is not compatible with the configuration of the fixed data form selected by the user for the specific print job.

In addition, in the situation shown in FIG. 6, if the non-compatibility message is displayed, such methods can also display menu options for user selection that provide alternative fixed data forms that have a configuration that is compatible with the configuration of the variable printing information, as shown in item 140.

Figure 7:
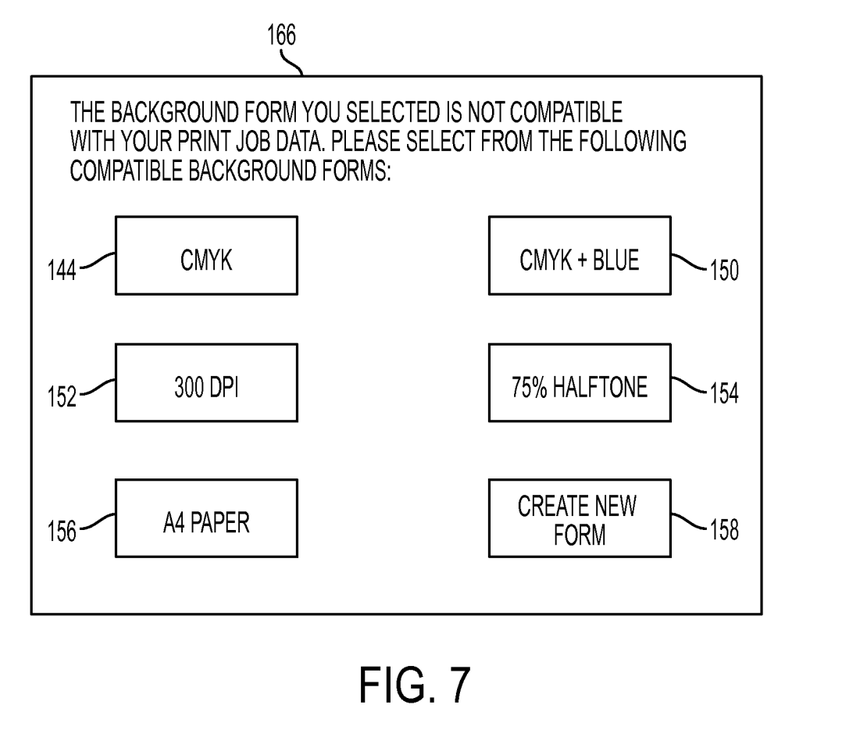
FIG. 7 is an exemplary screen display provided by various methods herein.

Another example of a screen shot 166 (that can be produced by the method shown in FIG. 2) is shown in FIG. 7. More specifically, item 166 in FIG. 7 is a message to the user that the background form that they selected is not compatible with the variable printing information (print job data) they provided. This message 166 asks the user to select from additional compatible background forms. In the example shown in FIG. 7, these forms include 144 CMYK (cyan, magenta, yellow, and black) marking materials and 150 CMYK and blue marking materials that are discussed above. However, as also noted above, the background forms can relate to different configuration elements including printing densities (e.g., a background form using 300 DPI (152)); different halftone dot frequencies (e.g., a background form using 75% halftoning (154)); different sized papers (e.g., a background form A4 size paper (156)); or the user can even be provided with an option to create a new background form 158, the selection of which allows the user to define resolution, marking materials utilized, halftone dot frequency, sheet size, bit depth etc.

The hardware described herein plays a significant part in permitting the foregoing method to be performed, rather than function solely as a mechanism for permitting a solution to be achieved more quickly, (i.e., through the utilization of a computer for performing calculations). More specifically, as would be understood by one ordinarily skilled in the art, the processes described herein cannot be performed by a human alone (or one operating with a pen and a pad of paper) and instead such processes can only be performed by a machine, especially when the processes of preparing data for printing, the processes of comparing unrasterized data with rasterized data, and the printing processes themselves, etc., are considered.

For example, if one were to manually attempt to perform the process of determining the compatibility of printing configurations of unrasterized variable data with rasterized fixed data performed by the methods discussed above, the manual process would be sufficiently inaccurate and take an excessive amount of time so as to render the results useless. Specifically, processes such as rasterizing data, comparing printing configurations, building print jobs, printing markings on sheets of paper based upon bitmaps, etc., requires the utilization of different specialized machines, and humans performing such processing would not produce useful results because of the time lag, inconsistency, and inaccuracy humans would introduce into the results; or simply because they are machine-only activities.

Additionally, the methods herein solve many highly complex technological problems. For example, as mentioned above, sometimes the configurations for the fixed data portions and the variable data portions are not compatible, which results in poor image quality and job integrity issues, or can even cause the printing system to stop printing and display faults. Systems and methods herein solve this technological problem by determining the compatibility of the variable printing information with each of the fixed data forms. With this, these systems and methods herein display menu selections of only the fixed data forms that have been determined to be compatible with the configuration of the variable printing information of the specific print job to prevent fixed data portions and the variable data portions that are not compatible from being included in a print, which eliminates poor image quality and job integrity issues.

Figure 8:
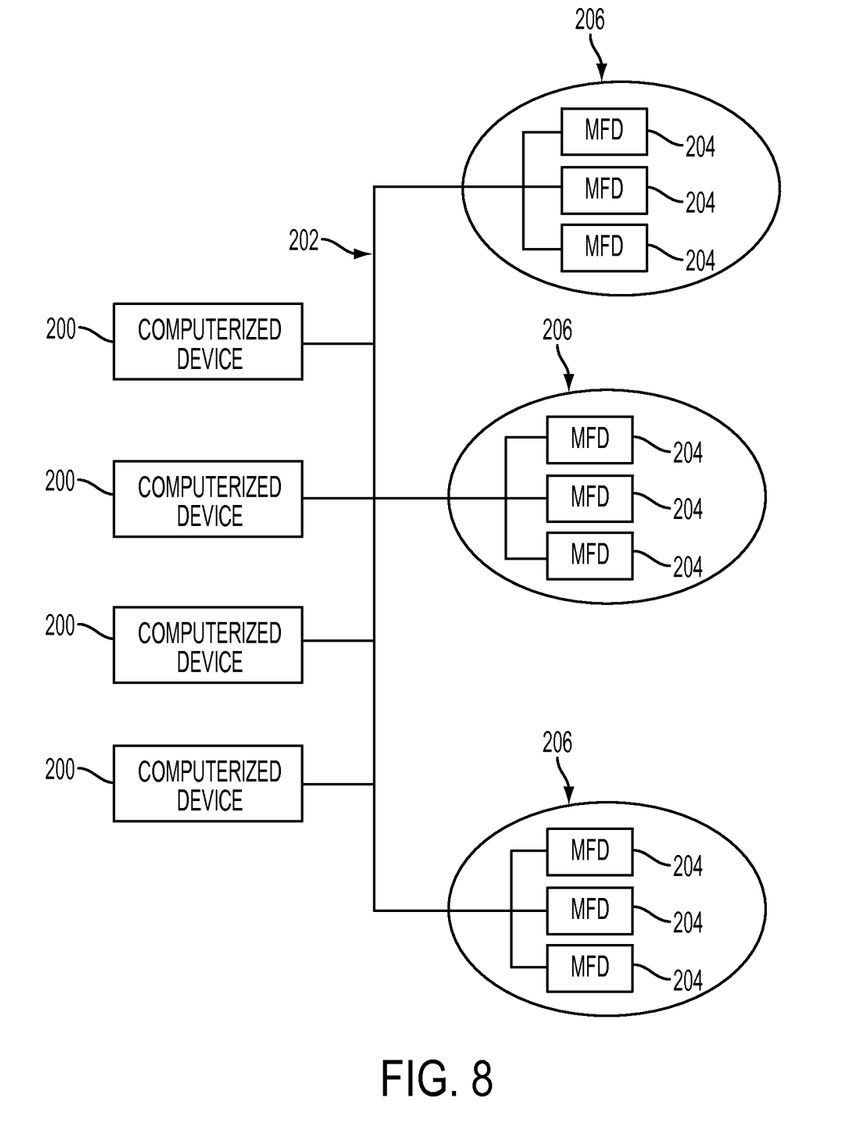
FIG. 8 is a schematic diagram illustrating systems herein.

As shown in FIG. 8, exemplary systems and methods herein include various computerized devices 200, 204 (that can perform the above methods) located at various different physical locations 206. The computerized devices 200, 204 can include print servers, printing devices, personal computers, etc., and are in communication (operatively connected to one another) by way of a local or wide area (wired or wireless) network 202.

Figure 9:
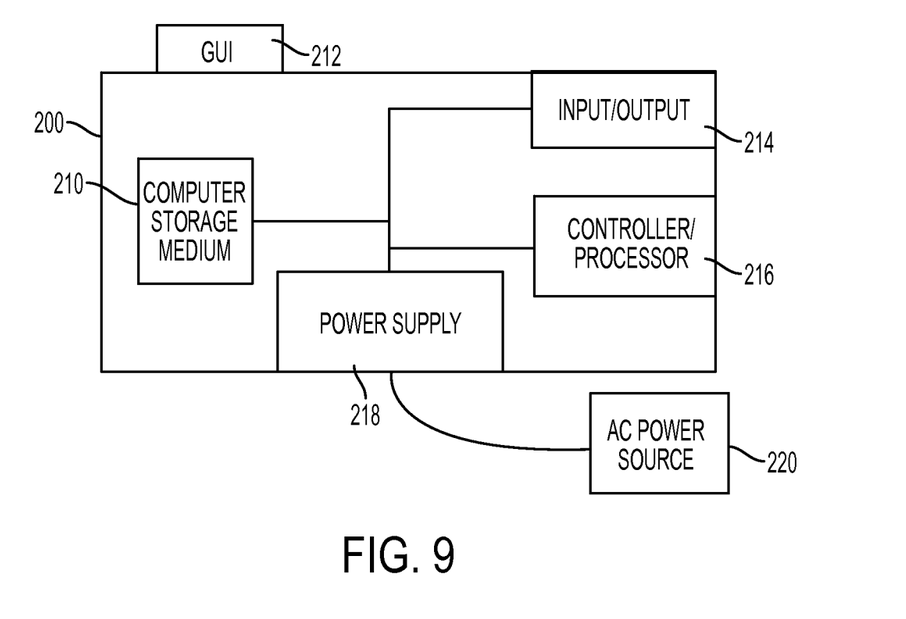
FIG. 9 is a schematic diagram illustrating devices herein.

FIG. 9 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

Figure 10:
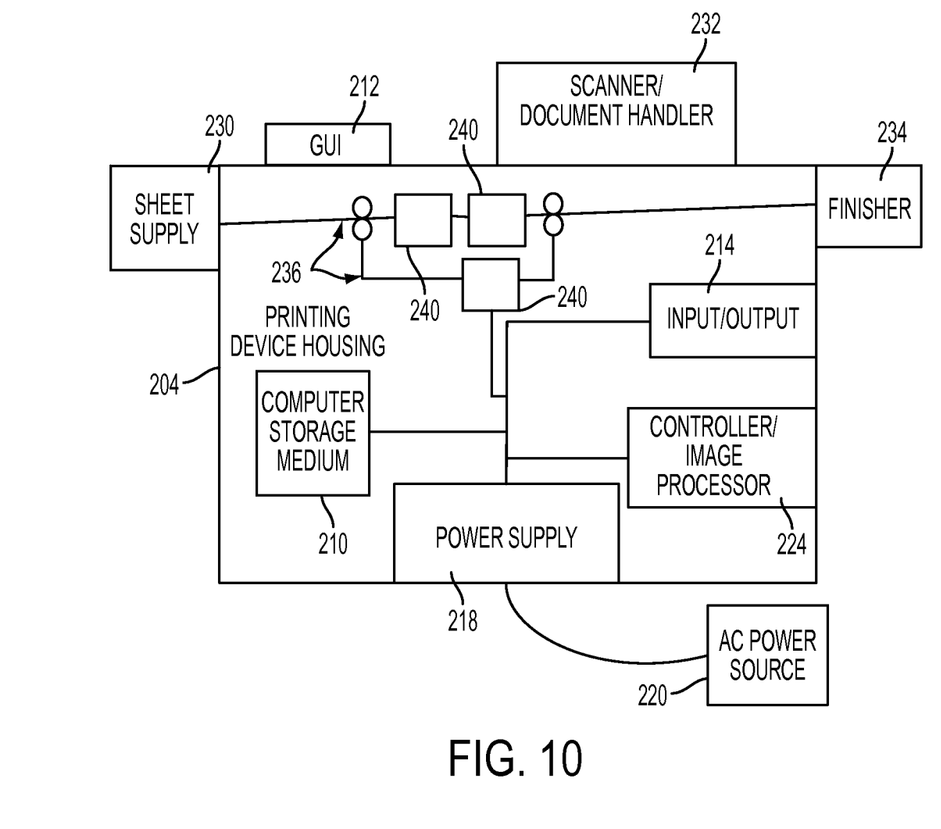
FIG. 10 is a schematic diagram illustrating devices herein.

FIG. 10 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt or devices that print directly to print media (e.g., inkjet printers, ribbon-based contact printers, etc.).

Thus, as shown above, exemplary printing systems herein include, among other components: a printing engine 240 (where the printing engine 240 performs printing using rasterized-type data); a printing processor 224 operatively (meaning directly or indirectly) connected to the printing engine 240; a graphic user interface 212 operatively connected to the printing processor 224; etc.

The printing processor 224 can receive print job instructions to combine variable printing information and fixed data forms to build a print job to be printed using the printing engine 240. The printing processor 224 can automatically evaluate the print job instructions to determine whether the configuration of the variable printing information is compatible with the configuration of the fixed data forms, for example, by comparing aspects of the variable printing information and the fixed data forms, including resolution, marking materials utilized, halftone dot frequency, sheet size, bit depth etc. The variable printing information and the fixed data form may each include multiple color planes, and therefore the printing processor 224 can evaluate the print job instructions to determine compatibility of each of the color planes of the variable printing information and the fixed data forms. As a result, the graphic user interface 212 automatically displays menu selections of only the fixed data forms determined to be compatible with the configuration of the variable printing information of the print job.

The printing processor 224 can also receive print job instructions to combine variable printing information and a specific fixed data form to build a print job to be printed using the printing engine 240. In this situation, the printing processor 224 automatically evaluates the print job instructions to determine whether a configuration of the variable printing information is compatible with a configuration of the fixed data form selected by the user for the print job. Here, the graphic user interface 212 automatically displays a non-compatibility message if the configuration of the variable printing information is not compatible with the configuration of the fixed data form selected by the user for the print job. If the non-compatibility message is displayed, the graphic user interface 212 can also automatically display menu options for alternative fixed data forms that have a configuration that is compatible with the configuration of the variable printing information. Also, in this situation, the printing processor 224 can be automatically limited to convert the variable printing information from unrasterized-type data to rasterized-type data only if the configuration of the variable printing information is compatible with the configuration of the fixed data form.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand.

A raster image processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network. Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing system comprising:
a printing engine, said printing engine performing printing using rasterized-type data;
a printing processor operatively connected to said printing engine; and
a user interface operatively connected to said printing processor,
said printing processor receiving print job instructions to combine variable printing information and fixed data form to build a print job to be printed using said printing engine,
said variable printing information comprising unrasterized-type data,
said fixed data form comprising said rasterized-type data,
said printing processor evaluating said print job instructions to determine whether a configuration of said variable printing information is compatible with a configuration of said fixed data form,
said user interface displaying a non-compatibility message that said fixed data form is not compatible and displaying menu options for alternative fixed data forms that have a configuration that is compatible with said configuration of said variable printing information based on said configuration of said variable printing information not being compatible with said configuration of said fixed data form, and
said printing processor converting said variable printing information from said unrasterized-type data to said rasterized-type data only if said configuration of said variable printing information is compatible with said configuration of said fixed data form.

2. The printing system according to claim 1, said printing processor evaluating said print job instructions by comparing aspects of said variable printing information and said fixed data form, including:
   resolution;
   marking materials utilized;
   halftone dot frequency;
   bit depth; and
   sheet size.

3. The printing system according to claim 1, said variable printing information and said fixed data form each comprising multiple color planes, and
   said printing processor evaluating said print job instructions to determine compatibility of each of said color planes of said variable printing information and said fixed data form.

4. The printing system according to claim 1, said fixed data form comprising at least one of a watermark, a printed texture, a background color, and background artwork.

5. A method comprising:
   receiving, into a user interface, print job instructions to combine variable printing information and a fixed data form to build a print job to be printed using a printing engine, said printing engine performing printing using rasterized-type data, said variable printing information comprising unrasterized-type data, and said fixed data form comprising said rasterized-type data;
   evaluating said print job instructions, using a printing processor operatively connected to said user interface, to determine whether a configuration of said variable printing information is compatible with a configuration of said fixed data form;
   displaying a non-compatibility message that said fixed data form is not compatible and displaying menu options for alternative fixed data forms that have a configuration that is compatible with said configuration of said variable printing information on said user interface based on said configuration of said variable printing information not being compatible with said configuration of said fixed data form; and
   converting said variable printing information from said unrasterized-type data to said rasterized-type data only if said configuration of said variable printing information is compatible with said configuration of said fixed data form, using said printing processor.

6. The method according to claim 5, said evaluating said print job instructions comprising comparing aspects of said variable printing information and said fixed data form, including:
   resolution;
   marking materials utilized;
   halftone dot frequency;
   bit depth; and
   sheet size.

7. The method according to claim 5, said variable printing information and said fixed data form each comprising multiple color planes, and
   said evaluating said print job instructions further comprising determining compatibility of each of said color planes of said variable printing information and said fixed data form.

8. The method according to claim 5, said fixed data form comprising at least one of a watermark, a printed texture, a background color, and background artwork.

9. The printing system according to claim 1, said printing processor evaluating said print job instructions determines whether said fixed data form is valid.

10. The method according to claim 5, said evaluating said print job instructions determines whether said fixed data form is valid.

11. A printing system comprising:
    a printing engine, said printing engine performing printing using rasterized-type data;
    a printing processor operatively connected to said printing engine; and
    a user interface operatively connected to said printing processor,
    said printing processor receiving print job instructions to combine variable printing information and fixed data form to build a print job to be printed using said printing engine,
    said variable printing information comprising unrasterized-type data,
    said fixed data form comprising said rasterized-type data,
    said printing processor evaluating said print job instructions to determine whether a configuration of said variable printing information is compatible with a configuration of said fixed data form,
    said user interface displaying a non-compatibility message that said fixed data form is not compatible, based on said configuration of said variable printing information not being compatible with said configuration of said fixed data form, and
    said printing processor converting said variable printing information from said unrasterized-type data to said rasterized-type data only if said configuration of said variable printing information is compatible with said configuration of said fixed data form.

12. The printing system according to claim 11, said printing processor evaluating said print job instructions by comparing aspects of said variable printing information and said fixed data form, including:
    resolution;
    marking materials utilized;
    halftone dot frequency;
    bit depth; and
    sheet size.

13. The printing system according to claim 11, said variable printing information and said fixed data form each comprising multiple color planes, and
    said printing processor evaluating said print job instructions to determine compatibility of each of said color planes of said variable printing information and said fixed data form.

14. The printing system according to claim 11, said fixed data form comprising at least one of a watermark, a printed texture, a background color, and background artwork.

15. The printing system according to claim 11, said printing processor evaluating said print job instructions determines whether said fixed data form is valid.

16. A method comprising:
    receiving, into a user interface, print job instructions to combine variable printing information and a fixed data form to build a print job to be printed using a printing engine, said printing engine performing printing using rasterized-type data, said variable printing information comprising unrasterized-type data, and said fixed data form comprising said rasterized-type data;
    evaluating said print job instructions, using a printing processor operatively connected to said user interface, to determine whether a configuration of said variable printing information is compatible with a configuration of said fixed data form to invalidate said fixed data form;

displaying a non-compatibility message that said fixed data form is not compatible, based on said configuration of said variable printing information not being compatible with said configuration of said fixed data form; and converting said variable printing information from said unrasterized-type data to said rasterized-type data only if said configuration of said variable printing information is compatible with said configuration of said fixed data form, using said printing processor.

17. The method according to claim 16, said evaluating said print job instructions comprising comparing aspects of said variable printing information and said fixed data form, including:

resolution;

marking materials utilized;
halftone dot frequency;
bit depth; and
sheet size.

18. The method according to claim 16, said variable printing information and said fixed data form each comprising multiple color planes, and said evaluating said print job instructions further comprising determining compatibility of each of said color planes of said variable printing information and said fixed data form.

19. The method according to claim 16, said fixed data form comprising at least one of a watermark, a printed texture, a background color, and background artwork.

20. The method according to claim 16, said evaluating said print job instructions determines whether said fixed data form is valid.

* * * * *